Nov. 12, 1946.   J. J. RAMSEY   2,410,901
VIAL OPENING DEVICE
Filed Dec. 11, 1944

INVENTOR.
Jesse J. Ramsey
BY Victor J. Evans & Co.
ATTORNEYS

Patented Nov. 12, 1946

2,410,901

UNITED STATES PATENT OFFICE 2,410,901

VIAL OPENING DEVICE

Jesse J. Ramsey, Cairo, Ill.

Application December 11, 1944, Serial No. 567,639

2 Claims. (Cl. 49—52)

The invention relates to a cutting tool, and more especially to a vial opening device.

The primary object of the invention is the provision of a device of this character, wherein the end of an ampoule can be cut off or severed, irrespective of the size of the vial, the device being hand operated, thereby eliminating the slow and dangerous method, in the use of a small file, as is generally done.

Another object of the invention is the provision of a device of this character, wherein its operation is most positive and accurate for the cutting of the ends of vials with ease and dispatch.

A further object of the invention is the provision of a device of this character, wherein the vial or ampoule is clamped between a pair of jaws for the firm and secure holding of such vial or ampoule during the cutting period or operation of the device, without liability of injury to the operator thereof.

A still further object of the invention is the provision of a device of this character, which is simple in construction, thoroughly reliable and efficient in operation, strong, durable, readily and easily handled, requiring little effort on the part of a user for the opening of a vial or ampoule, and inexpensive to manufacture.

With these and other objects in view, the invention consists in the features of construction, combination and arrangement of parts as will be hereinafter more fully described, illustrated in the accompanying drawing, which discloses the preferred and modified forms of construction of the invention, and pointed out in the claims hereunto appended.

In the accompanying drawing.

Similar reference characters indicate corresponding parts throughout the several views in the drawing.

Figure 1:
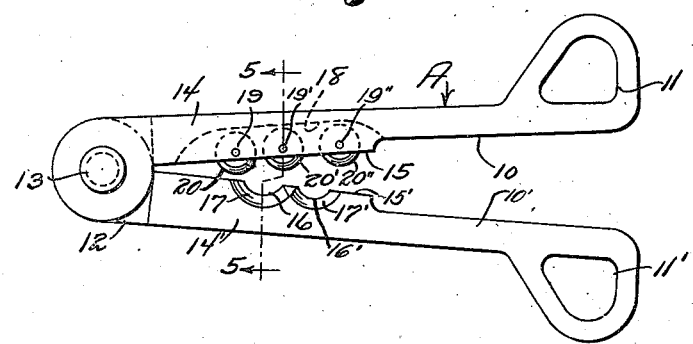
Figure 1 is a side view of the device constructed in accordance with the invention.
Figure 2:
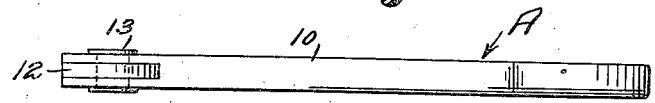
Figure 2 is a top edge view thereof.
Figure 3:
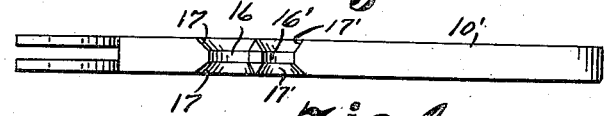
Figure 3 is an inside edge view of one of the jaw members of the device.
Figure 4:
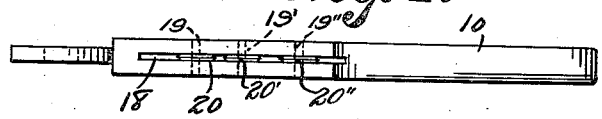
Figure 4 is a view similar to Figure 3 of the other member of the device.
Figure 5:
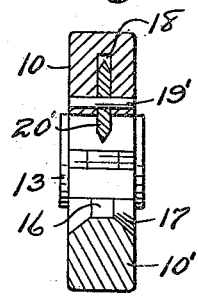
Figure 5 is a sectional view taken on the line 5—5 of Figure 1 looking in the direction of the arrows.

Referring to the drawing in detail, A designates generally the device constituting a tool constructed in accordance with the invention, and comprises a pair of opposed lever-handles 10 and 10' respectively, which have finger eyes or grips 11 and 11' respectively at their outer ends, while the opposite ends are swingingly interfitted at 12, and connected together by a cross pivot 13 for the opening and closing of the said device in the use thereof.

The areas 14 and 14' respectively next to the pivoted ends of the lever-handles 10 and 10' respectively and at the innermost edges thereof are raised straight faced jaws 15 and 15' respectively, one of which has cut through its straight face several close or meeting substantially half circular shaped notches 16 and 16' respectively, forming seats with reversely beveled edgings 17 and 17' respectively for partially encircling the neck of a vial or ampoule, not shown, each notch 16 is differently sized to the notch 16', so that different sizes of vials or ampoules can be properly seated therein in conformity to the size of such notch adaptable thereto. There can be any number of these notches present in the device A to meet the requirements of varying sizes of vials or ampoules to be operated upon in the use of the device.

The jaw 15 opposite the notches 16 and 16' has longitudinally therein an elongated channel 18 in which is rotatably fitted on turning axles or arbors 19, 19' and 19'' respectively a series of spaced cutting wheels or disks 20, 20' and 20'' respectively these being pair grouped to each notch 16 and 16' respectively, spaced one from the other on opposite sides of the transverse center of such notch, and function to sever the end of the vial or ampoule when grasped between the jaws 15 and 15', for the removal of such end with resultant opening of the said vial or ampoule.

Figures 6, 7:
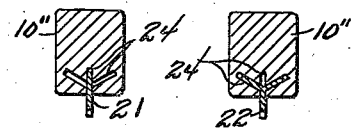
Figure 6 is a cross-sectional view showing a modified form of cutter mounting.
Figure 7 is a view similar to Figure 6 showing a further modification.
Figure 8:
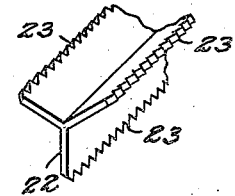
Figure 8 is a fragmentary perspective view of the cutter shown in Figure 7 detached.

In Figure 6 of the drawing, there is shown a slight modification of the device, wherein a straight cutting blade 21 is fitted in the jaw 10'' in substitute for the wheels or disks 20, 20' and 20'', while in Figures 7 and 8, there is shown a further modification, which involves a triple blade cutter 22, its blades having saw-tooth cutting edges 23, the blades 21 and 22 are releasably seated in the proper jaw of the device, and the said cutter 22 is designed for blade changing purposes, when one of its cutting edges 23 becomes dull. The seat 24 for these blades is accessible through one end of the jaw for receiving the same, of the device.

When a vial or ampoule is engaged in the device A and the latter is closed about the neck of such vial or ampoule with pressure on the handles 10 and 10', then a half turn of such vial or ampoule effects the severing of the end of the latter for the opening thereof.

From the foregoing, it is thought that the construction, and manner of use of the device A will be clearly understood, and therefore a more extended explanation has been omitted.

What is claimed is:

1. A device of the kind described, comprising a pair of pivotally connected opposed lever-handles, finger grips at the outer ends of said lever handles, raised straight jaws formed on the inner surfaces of said lever handles adjacent their pivotal connection, one of said straight jaws having an inside notched face and the other straight jaw having a channeled face, respectively, and rotatable cutting disks fitting the channeled straight jaw in confronting relation to the notched straight jaw.

2. A device of the kind described, comprising a pair of pivotally connected opposed lever-handles, finger grips at the outer ends of said lever handles, raised straight jaws formed on the inner surfaces of said lever handles adjacent their pivotal connection, one of said straight jaws having an inside notched face and the other straight jaw having a channeled face, respectively, and rotatable cutting disks fitting the channeled straight jaw in confronting relation to the notched straight jaw, the notches being of varying sizes with respect to each other and having beveled edgings for engaging the neck of a vial or ampoule.

JESSE J. RAMSEY.